United States Patent [19]

Holbus

[11] Patent Number: 4,852,199
[45] Date of Patent: Aug. 1, 1989

[54] AUTOMATIC VEHICLE WASHING APPARATUS

[76] Inventor: Edward Holbus, 500 Cross Creek Rd., Racine, Wis. 53402

[21] Appl. No.: 180,329

[22] Filed: Apr. 11, 1988

[51] Int. Cl.⁴ .................................................. B60S 3/04
[52] U.S. Cl. .................................. 15/97 B; 15/DIG. 2
[58] Field of Search ................ 15/97 B, DIG. 2, 97 R

[56] References Cited

U.S. PATENT DOCUMENTS

| | | | |
|---|---|---|---|
| 3,345,666 | 10/1967 | Hanna et al. | 15/97 B |
| 3,711,883 | 1/1973 | Ennis | 15/97 B |
| 3,765,043 | 10/1973 | Lesser | 15/97 B |
| 3,859,686 | 1/1975 | Breish | 15/97 B |
| 4,096,600 | 6/1978 | Belanger | 15/97 B |
| 4,453,284 | 6/1984 | Schleeter | 15/97 B |
| 4,462,133 | 7/1984 | Hanna | 15/97 B |

*Primary Examiner*—Edward L. Roberts
*Attorney, Agent, or Firm*—Quarles & Brady

[57] ABSTRACT

A vehicle washing apparatus includes a pair of elevated, parallel tracks along which a carriage is moved. The carriage supports hanging strips formed of a series of sponge like elements joined end to end. The strips are formed into a transverse array and an array on each side of the carriage so as to cover the entire outer surface of a vehicle disposed in the volume between the tracks as the carriage is moved along the tracks. The transverse array is preceded by a water spray from nozzles mounted on the carriage, and additional nozzles are mounted from the carriage on the outside of the side arrays to direct a water spray against the side strips to hold such strips against the vehicle. Stationary water spray nozzles are also provided along the length of the track to provide a rinse spray for the vehicle. The strips and the spray nozzles may all be reciprocated during operation.

12 Claims, 4 Drawing Sheets

FIG. 4
FIG. 2
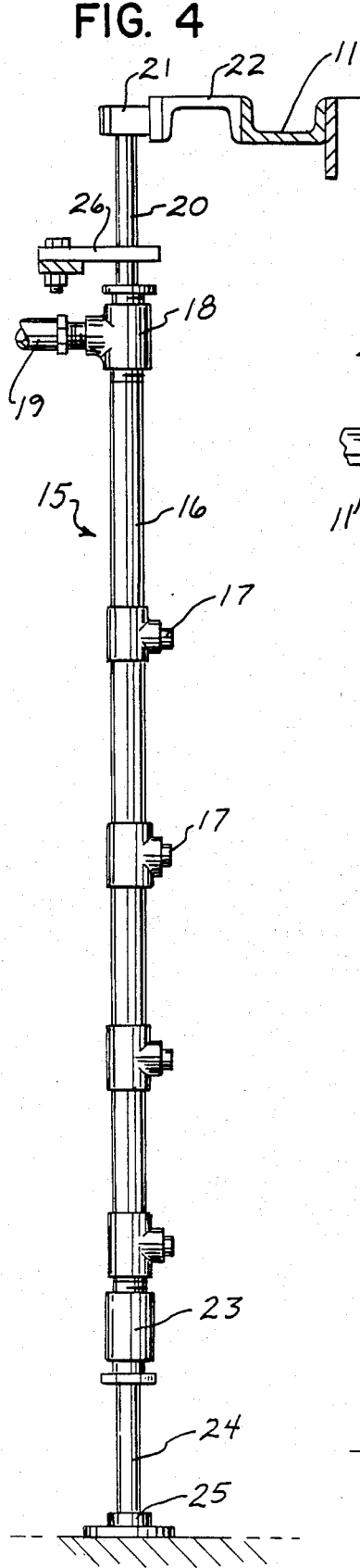
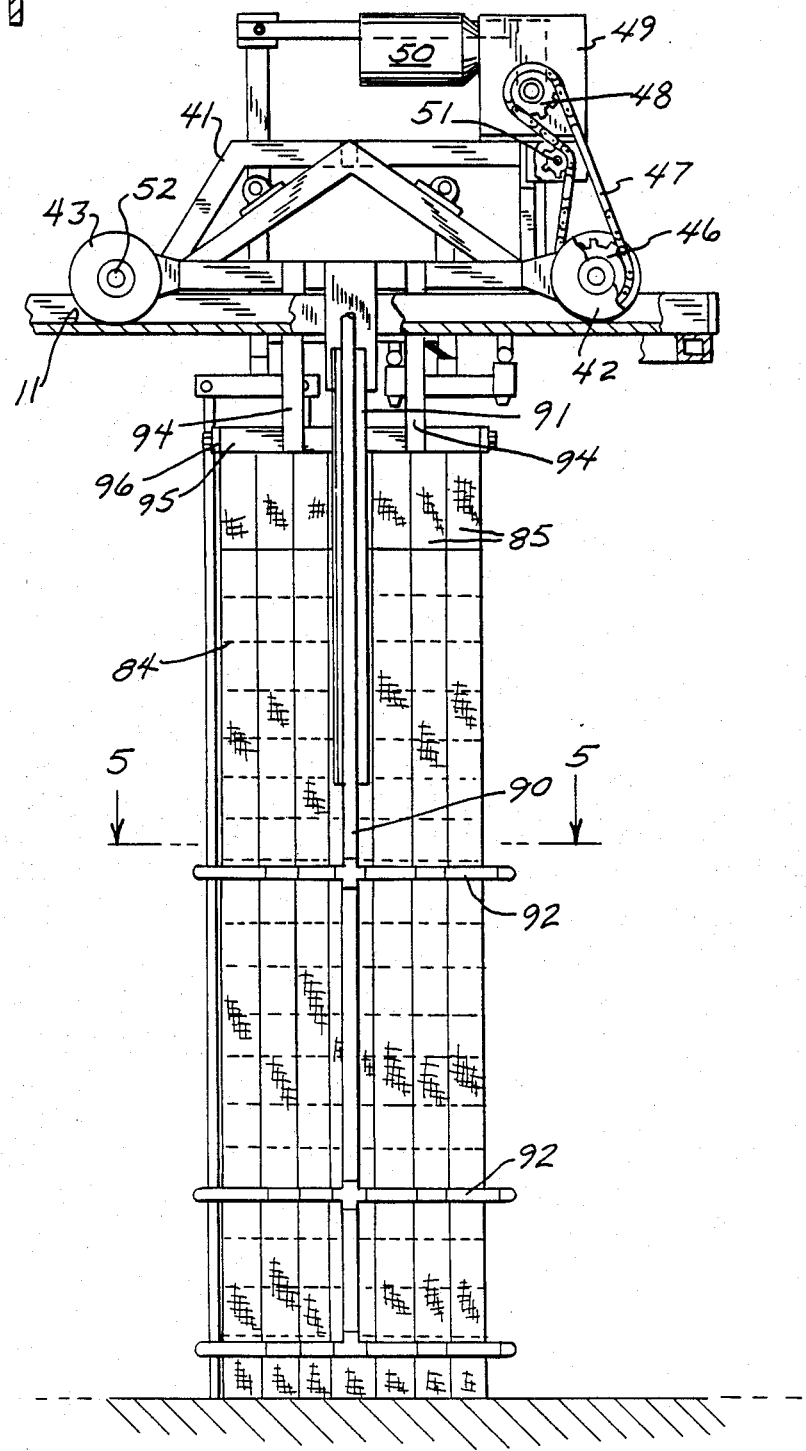

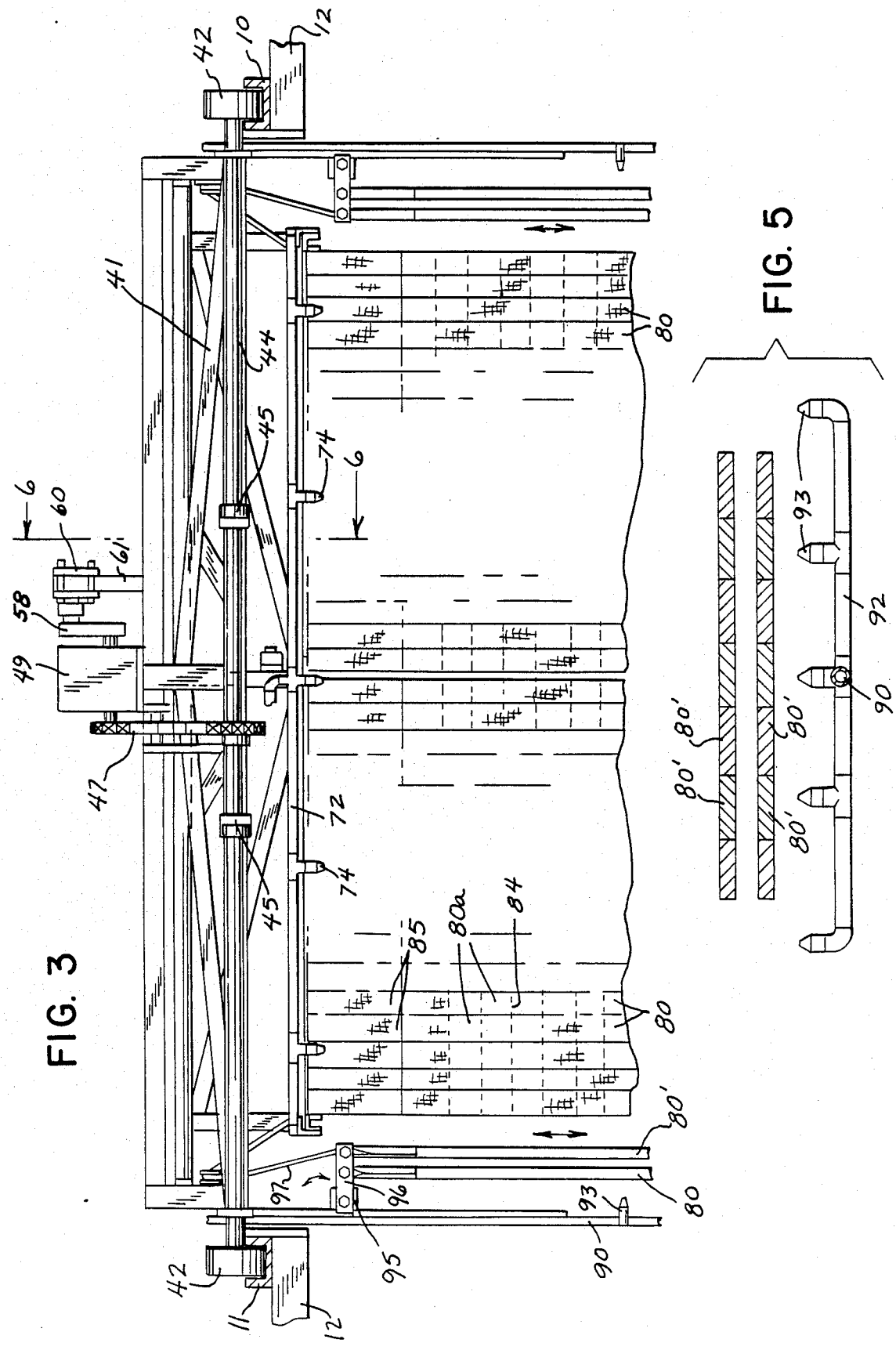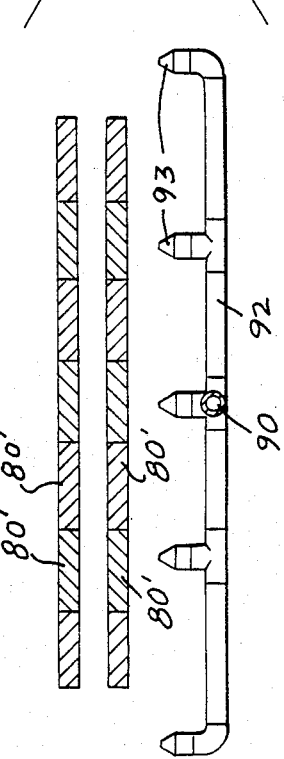

AUTOMATIC VEHICLE WASHING APPARATUS

BACKGROUND OF THE INVENTION

This invention relates to vehicle washing, and particularly to an improved apparatus for automatically washing the exterior of an automobile or other similar vehicle.

Automatic vehicle washing apparatus is well known. The apparatus typically takes one of two generic forms. In one form, an automobile is moved by a conveyor through successive stations at which various washing operations take place, such as wetting, scrubbing and rinsing. The second approach is to automatically perform these same operations upon a stationary vehicle. The present invention is adaptable to both forms of washing apparatus.

A principal problem associated with all types of automatic car washes is the abrading that results to the surface of the vehicle during the scrubbing operation. The scrubbing is usually accomplished by rotating brushes that include relatively stiff bristles of synthetic resin material, or occasionally strips of fabric, either woven or felted. In either case, the high speed action of the brushes against the surface of the vehicle contributes to scratching and abrading, particularly if there is insufficient water to lubricate the surface as the scrubbing occurs.

The present invention provides an automatic vehicle washing apparatus which will more gently clean the surface of a vehicle than has heretofore been possible.

SUMMARY OF THE INVENTION

In accordance with the invention, hanging flexible and wettable strips and the vehicle to be washed are moved relative to each other from one end of the vehicle to the other end. The strips are arrayed both transversely of the length of the vehicle and along the two sides of the vehicle. The strips are preceded by a water spray. Additional water sprays hold the side strips against the sides of the vehicle.

The strips are each formed as a series of connected sponge-like elements. In the preferred embodiment, the sponge elements include an outer water permeable tube, and an inner water absorbable filling. A central stiffening member may also be included to provide dimensional stability. The strips may be formed by transversely stitching the assembled tube, filling, and stiffener member at spaced points along the length.

In the preferred embodiment, the vehicle is held stationary while a water spray is applied and the array of strips pass over the surface of the vehicle. The strips are suspended from a movable carriage disposed above the vehicle. The strips are reciprocated up and down as they travel over the surface of the vehicle. Additional stationary water nozzles may be located on either side of the path of carriage for rinsing the surface of the vehicle after the carriage has passed from one end of the vehicle to the other.

It is a principal object of the invention to provide an automatic vehicle washing apparatus which accomplishes rapid and effective but gentle cleaning of the surface of the vehicle.

It is another object of the invention to provide a car wash apparatus which uses a series of sponge-like elements to clean the surface of the vehicle.

It is also an object of the invention to provide an apparatus that can completely clean the surface of a vehicle in a very short period of operation.

The foregoing and other objects and advantages of the invention will appear from the following detailed description. In the description, reference is made to the accompanying drawings which illustrate a preferred embodiment of the invention.

BRIEF DESCRIPTION OF THE DRAWINGS

FIG. 2 is a side view in elevation of the traveling carriage of the vehicle wash, including water nozzles and washing strips suspended from the carriage;

FIG. 3 is a partial end view in elevation of the vehicle wash apparatus of FIG. 1;

FIG. 4 is a partial view in elevation of a stationary side sprinkler assembly taken in the plane of the line 4—4 of FIG. 1;

FIG. 5 is a view in section through the water nozzles and washing strips suspended from the side of the carriage and taken in the plane of the line 5—5 of FIG. 2;

DETAILED DESCRIPTION OF THE PREFERRED EMBODIMENT

Figure 1:
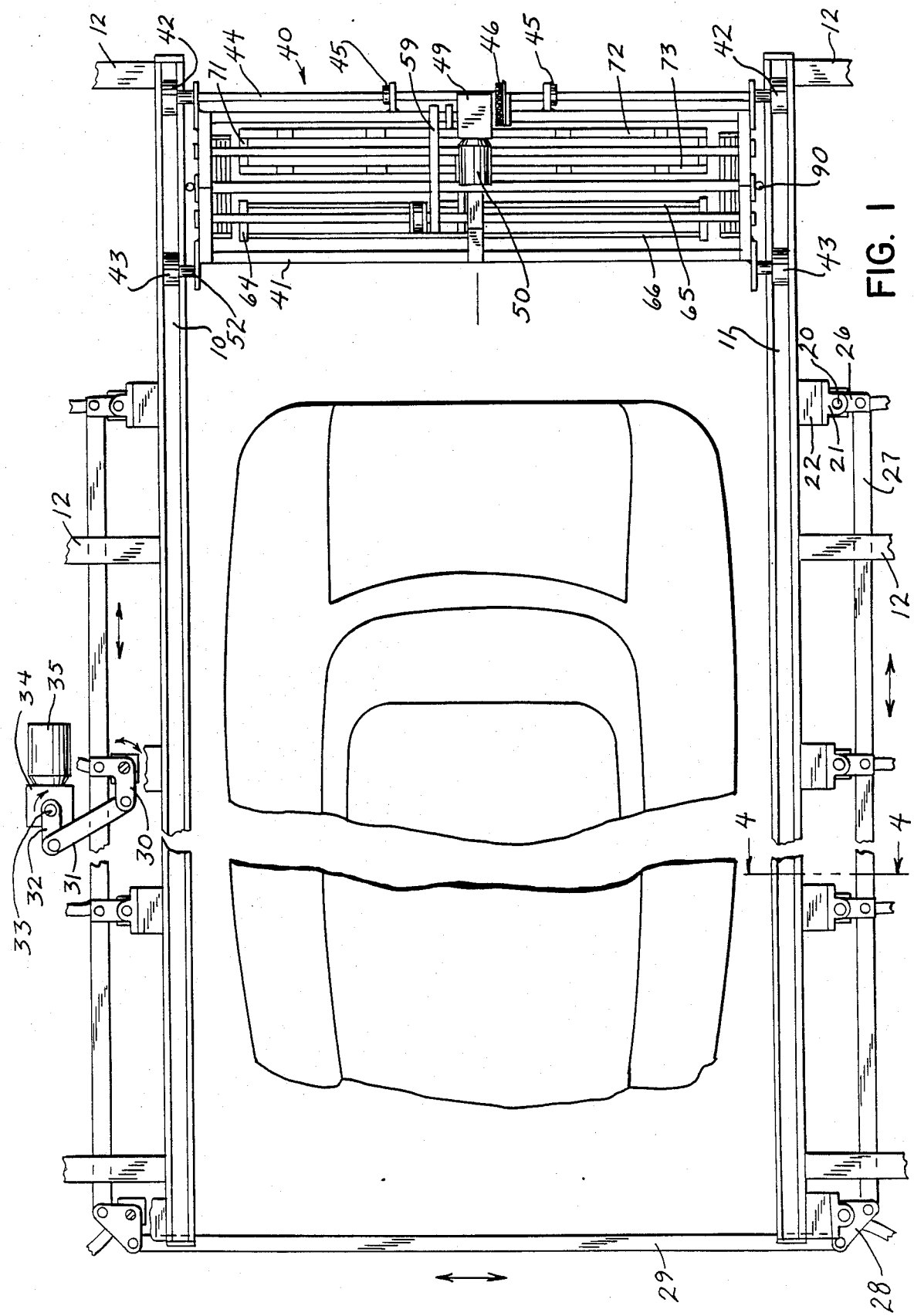
FIG. 1 is a top plan view of a vehicle wash apparatus in accordance with the present invention.

The vehicle wash assembly includes a pair of spaced tracks 10 and 11 in the form of channel irons and which are supported on side beams 12 which extend from the ceilings or walls of a bay of a building or other enclosure (not shown), or which are supported on columns rising from the floor of the building. The tracks 10 and 11 are spaced apart a distance sufficient to span the width of vehicles to be washed in the wash assembly. Located outside of the tracks 10 and 11 are a series of upright side sprinkler assemblies 15 that are spaced along the length of the tracks 10 and 11. The number of assemblies 15 is a matter of design choice. In the foreshortened arrangement illustrated in FIG. 1, there are four such sprinkler assemblies 15 shown on each side of the tracks 10 and 11. Each side sprinkler assembly includes a vertical water pipe 16 to which are joined a series of horizontal water spray nozzles 17. The upper end of the water pipe 16 is connected to a T-pipe connection 18 which in turn is connected to a flexible water hose 19. The other end of the T connection 18 mounts a vertical rod 20 which is supported in an upper bearing 21 attached by a channel section 22 to a side of one of the tracks 10 or 11. The bottom end of the water pipe 16 is connected through a coupling 23 to a lower rod 24 mounted in a lower bearing 25 anchored to the floor of the enclosure.

The entire sprinkler assembly 15 is free to be rotated about a vertical axis by reason of the mounting in the bearings 21 and 25. A mechanism is provided to rotate the sprinkler assemblies 15 in unison through an arc so that the streams of water exiting from the nozzle 17 will sweep through an arc of about 90°. As best seen in FIG. 1, the rocking mechanism includes a link 26 connected to each of the upper rods 20 and extending laterally to a respective elongated side link 27 which is spaced away from and parallel to the line of the sprinkler assemblies. The side links 27 each connect at one respective end to a three cornered pivot bracket 28 which is pivoted on one of the upper rods 20 of an end sprinkler assembly 15. The two triangular brackets 28 are joined together by an end link 29.

One of the connections of a side link 27 to an intermediate side sprinkler assembly 15 takes the form of a bell crank lever 30 whose free end is connected by a link 31 to the end of an eccentric 32 mounted on the output shaft 33 of a right angle drive 34 that is driven by an electric motor 35.

As will be apparent from FIG. 1, rotation of the output shaft 33 of the drive 34 by the motor 35 will translate the rotary motion of the shaft 33 into a reciprocating motion of the side links 27 and end link 29 and will, in turn, cause the horizontal water nozzle 17 to be swept through an arc.

A carriage designated generally by the numeral 40 travels back and forth along the parallel tracks 10 and 11. The carriage 40 includes a frame 41 that mounts pairs of forward and rear wheels 42 and 43, respectively, that travel in the tracks 10 and 11. The frame 41 spans the space between the tracks 10 and 11 and supports nozzles for delivering water and hanging washing strips that contact the vehicle surface as the carriage moves along the tracks 10 and 11.

The front carriage wheels 42 are mounted on a drive shaft 44 that is held in bearings 45 extending forward from the frame 41. The drive shaft 44 also mounts a sprocket wheel 46 which is engaged by a chain 47 that is driven by a drive pinion 48 on the output shaft of a right angle drive 49 driven by another electric motor 50. The chain tension is adjustable by an idler sprocket 51, as shown in FIG. 2. The rear wheels 43 are mounted on shafts 52 extending from the rear of the frame 41.

Figure 6:
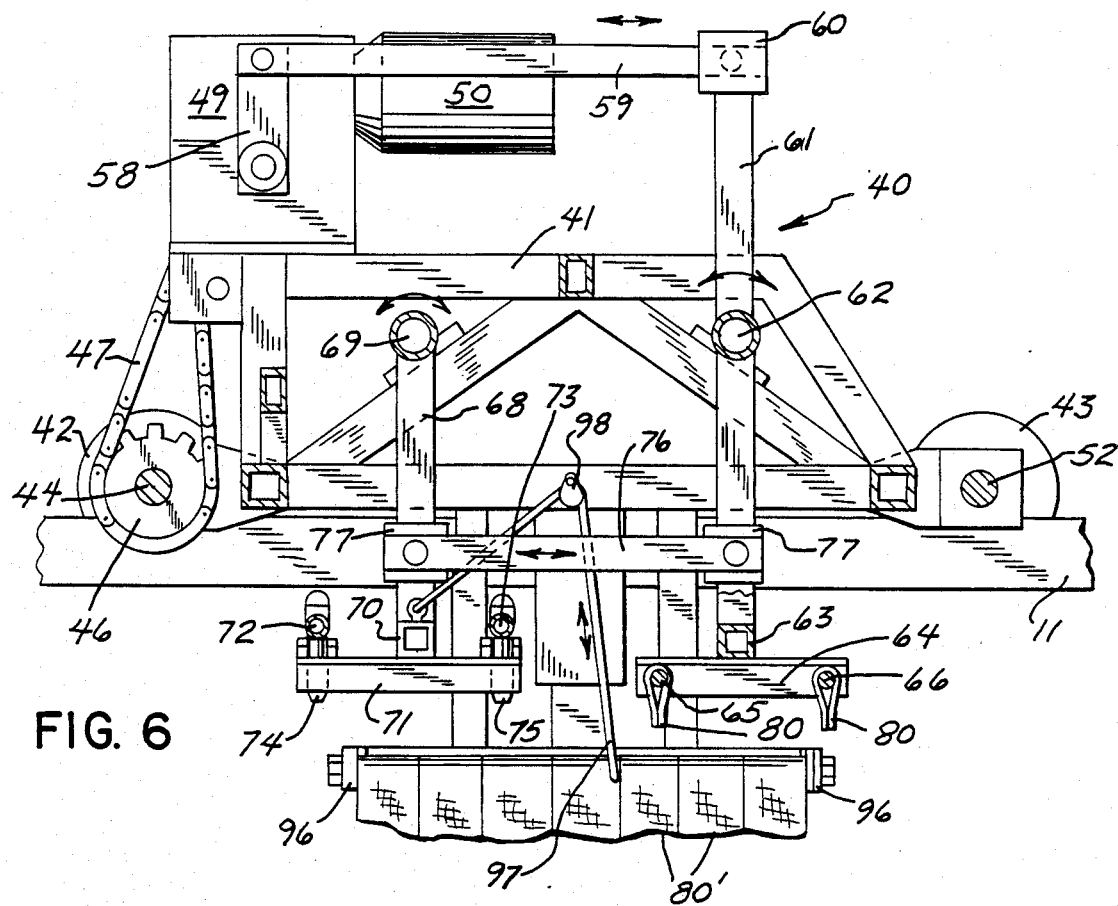
FIG. 6 is a view in elevation of the carriage to an enlarged scale and taken in the plane of the line 6—6 of FIG. 3.

The output shaft of the right angle drive 49 also mounts an eccentric link 58 which is pivotally connected to one end of a horizontal link 59. The other end of the link 59 is pivotally connected through a pivot block 60 to the top of a lever 61, as shown in FIGS. 3 and 6. The lever 61 is pivotally mounted intermediate its ends on a shaft 62 that extends from the frame 41. The lever end of the lever 61 is connected to the top of a hollow box support bar 63 that extends along a major portion of the distance between the lateral sides of the frame 41. The bar 63 mounts a pair of transverse angle brackets 64 at its ends which support front and rear rods 65 and 66 respectively which mount two side by side series of depending washing strips, as will be more fully described hereafter. Forward of the lever 61 is a depending link 68 which is also pivotally mounted at its upper end on a shaft 69 secured to the frame 41. The bottom of the vertical link 68 is attached to the top of a hollow box support member 70 which is generally coextensive with that of the box member 63 and which also mounts spaced transverse angle brackets 71. The brackets 71 support front and rear horizontal water pipes 72 and 73, respectively, each having a series of depending water spray nozzles 74 and 75, respectively. The lever 61 and vertical link 68 are joined together by a horizontal link 76 through pivot blocks 77.

As seen particularly in FIG. 6, as the output shaft of the right angle drive 49 rotates the eccentric link 58, the horizontal link 59 will move to and fro thereby pivoting the upper end of the lever 61 causing the lower end of the lever 61 as well as the vertical link 68 to sweep through an arc. The pivoting of the lower end of the vertical link 68 is translated into a sweeping motion of the angle bracket 71 attached to the hollow box member 70 thereby causing the water nozzles 74 and 75 mounted on the angle brackets 71 to sweep through an arc, in much the same manner as the horizontal water nozzles 17 on the side sprinkler assemblies 15. The pivoting of the lower end of the lever 61 will cause the rear angle brackets 64 to also sweep through an arc. This movement will result in an up and down motion of the washing strips 80 hanging from the rods 65 and 66.

The washing strips 80 are mounted side by side on the rods 65 and 66. The active portion of the length of each strip 80 is formed with a woven outer tube 81 of a natural or synthetic fiber material, such as nylon, which is filled with a fiber batting 82 of a natural or synthetic material. The center of the strip 80 is occupied by a semi-rigid stiffening member 83 of a felted fiber material, either natural or synthetic. The stiffening member 83 maintains the dimensional length of the strip 80. The stiffening member 83 may be omitted if the tube 81 and filler 82 have sufficient dimensional stability by themselves.

Figure 7:
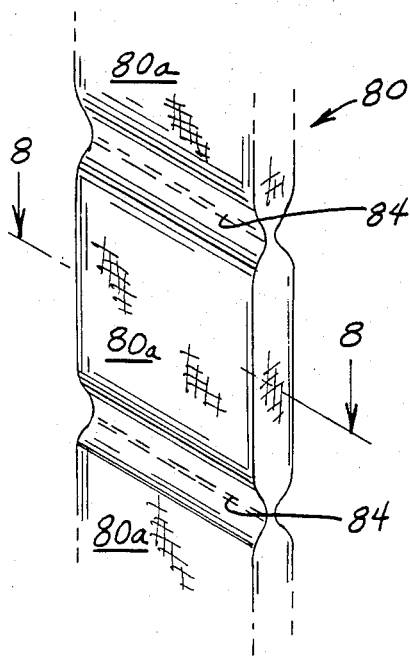
FIG. 7 is a partial view in perspective of a length of a washing strip.
Figure 8:
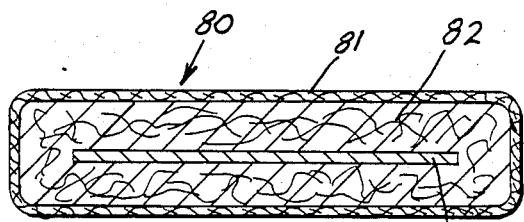
FIG. 8 is a view in section of the washing strip to an enlarged scale and taken in the plane of the line 8—8 of FIG. 7.

As shown particularly in FIG. 7, the tube 81 is transversely stitched at spaced points along its length to provide individual relatively thick sections 80a which act as sponges that are joined together by thinner web portions at the stitching 84. The stitching 84 passes through the tube 81, the fill 82, and the stiffening member 83. The upper end of each strip 80 is formed of a stiff felted material 85 such as that used for indoor/outdoor carpeting and which is typically comprised of polypropolene fibers. The felting 85 is looped over the rods 65 and 66, which may be covered with a plastic pipe (not shown), and is stitched together and to the upper and of the assembled tube 81 at a point beneath the rods. The strips 80 hang freely from the rods 65 and 66 transverse to the length of the vehicle to be washed Although only two series of strips 80 are shown hanging from the angle brackets 64, additional series of strips 80 could be attached to additional rods supported on the angle brackets 64. The spray nozzles 74 and 75 can also be supported on the frame apart from the angle brackets 71 and the series of forward nozzles 74 could be arranged on an arch to surround the top and sides of the vehicle.

The carriage 40 also supports an array of side strips 80 and a side water nozzle assembly on both ends of the frame 41. As seen particularly in FIG. 2, a vertical water pipe 90 is suspended from a metal bracket 91 attached to each end of the frame 41 inside the tracks 10 and 11. Each vertical pipe 90 has a plurality of horizontal headers 92 extending from both sides of the pipe 90, and each header 92 includes a plurality of horizontal, inwardly directed water spray nozzles 93. Also extending downwardly from each end of the frame 41 are a pair of spaced metal straps 94 which attach to a horizontal bracket 95. A pair of pivotal end brackets 96 are pivotally attached at the ends of the horizontal bracket 95. The pivotal end brackets 96 mount a pair of spaced rods which support two series of strips 80 which are identical in construction to the strips 80 previously described.

One of the rods spanning the pivotal end brackets 96 is connected to a cord 97 that extends over a pully 98 and is attached at its other end to the top of the front box member 70, as shown particularly in FIG. 6. As a result of this attachment, the cord 97 will be pulled up and down as the box member 70 pivots through its reciprocating motion and the side strips 80' will be moved up and down.

In operation, a vehicle to be washed would be driven into the space between the tracks 10 and 11 and between the side sprinkler assemblies 15, as shown in FIG. 1. Prior to this time, the carriage 40 would have been moved to a position at the left end of the apparatus as viewed in FIG. 1 so that the carriage would be at the front of the vehicle. Water under high pressure, such as 1,000 psi, would be delivered to the front horizontal water pipe 72 on the carriage 40 through a suitable flexible hose and exit the first vertical water nozzles 74 at a rate of about 60 gallons per minute. Also, a water and detergent mixture would be delivered at a lower pressure, such as 200 psi, to the second horizontal water pipe 73 for delivery out of the second vertical nozzles 75 at a rate of about 150 gallons per minute. At the same time, the electric motor 50 on the carriage 40 would be energized to thereby drive the front wheels 42 and move the carriage 40 from its position in front of the vehicle along the tracks over the top of the vehicle and towards the rear thereof. The movement of the carriage 40 by the electric motor 50 will also cause the vertical nozzles 74 and 75 to sweep through an arc.

The resulting high pressure spray from the nozzle 74 will wet the surface of the vehicle and the subsequent water and detergent spray from the second series of nozzles 75 will provide wash water to the surface of the vehicle and to the strips 80 and 80'. The two sprays of high pressure water and wash water to the surface of the vehicle are immediately followed by contact of the hanging strips 80 and 80'. The strips 80 and 80' will be moved up and down over the surface of the vehicle as the carriage moves. The side strips 80' will be held against the sides of the vehicle by the strength of the spray from the side nozzles 93 to which a mixture of water and detergent will be delivered at the lower pressure of 200 psi and at a rate of 150 gallons per minute.

The transverse series of washing strips 80 will engage the front of the vehicle and then drape over the hood, roof and rear deck as the carriage moves from the front to the rear on the tracks 10 and 11, thereby washing all of those surfaces The side strips 80' will engage the sides of the vehicle as the carriage moves and will thereby wash the side surfaces.

When the carriage 40 has traversed the entire length of the tracks 10 and 11, it will stop, and water will be delivered under pressure to the horizontal water spray nozzle 17 on the side sprinkler assemblies 15 to rinse the entire surface of the vehicle after the washing has taken place.

The carriage 40 can then be returned along the length of the tracks 10 and 11 to its starting point in readiness for the next vehicle.

Each of the sponge elements 80a of the strips 80 and 80' are capable of holding large amounts of water. The weight of water held in the sponge elements 80a plus the effect of the water sprays pushing sponges against the surface of the vehicle combine to provide a cleaning action which will remove dirt and other sediments from the surface of the vehicle.

Although the preferred embodiment operates on a stationary vehicle while moving the washing strips and water sprays relative to the surface of the vehicle, the invention can also be readily adapted to an arrangement in which the strips and water sprays are stationary and the vehicle is moved by a conveyor through the strips and water sprays. For example, the carriage arrangement 40 could be stationary in a position shown in FIG. 1 while the vehicle was driven from the right to the left as viewed in FIG. 1. In such an arrangement, the vehicle would first encounter the water and water detergent sprays emanating from the nozzles 74 and 75 and would then encounter the transverse strips 80 and side strips 80' as the vehicle continued its movement. Once past the strips 80 and 80', the vehicle would encounter the space between the side sprinkler assemblies 15 where the vehicle surface would be rinsed by the sprays from the horizontal nozzles 17.

I claim:

1. A washing apparatus for a vehicle, comprising:
a plurality of hanging flexible and wettable washing strips arrayed transverse to the length of the vehicle and on both sides of the vehicle;
means for moving the plurality of strips and the vehicle relative to each other from one ⓔnd of the vehicle to the other end of the vehicle; and
means for delivering water to the surface of the vehicle in advance of the strips,
said washing strips being each formed of a plurality of sponge elements arranged end to end along the length of the strip, the sponge elements comprising an outer water permeable tube and an inner water absorbable filling.

2. A vehicle washing apparatus arranged about a volume of space into which a vehicle can be introduced, comprising:
a carriage movable in a path along the length of the volume at the top thereof;
a transverse array of individual flexible, wettable washing strips from the carriage and extending transverse to the path of travel of the carriage such that the transverse array of strips will pass through the entire volume as the carriage moves;
transverse water distribution means mounted on the carriage for directing a spray of water downwardly into the volume against the surface of the strips;
a side array of individual flexible, wettable washing strips depending from the carriage on each side of the volume; and
side water distribution means depending from the carriage and disposed to the outside of the side arrays of strips and adapted for delivering water against the side array of strips to hold such strips against the surface of a vehicle in the volume.

3. A washing apparatus in accordance with claim 2, wherein the washing strips are each formed of a plurality of sponge elements arranged end to end along the length of the strip.

4. A vehicle washing apparatus in accordance with claim 3 wherein the sponge elements comprise an outer water permeable tube, an inner water absorbable filling, and a central stiffening member.

5. A vehicle washing apparatus in accordance with claim 4 wherein the sponge elements are defined by transverse seams spaced along the length of a strip.

6. A vehicle washing apparatus in accordance with claim 2 together with means for moving the strips up and down as the carriage moves along the path.

7. A vehicle washing apparatus arranged about a volume of space into which a vehicle can be introduced, comprising:
a carriage movable in a path along the length of the volume at the top thereof;

United States Patent [19]

Wundrock et al.

[11] Patent Number: 4,852,201
[45] Date of Patent: Aug. 1, 1989

[54] TOILET BOWL CLEANER

[75] Inventors: John A. Wundrock, West Bend; Mary L. Conrardy, Wauwatosa, both of Wis.

[73] Assignee: Badger Pharmacal, Inc., Jackson, Wis.

[21] Appl. No.: 197,684

[22] Filed: May 23, 1988

[51] Int. Cl.⁴ .............................................. A46B 17/02
[52] U.S. Cl. .................................. 15/145; 15/147 R; 15/228; 15/244.1
[58] Field of Search .................... 15/147 R, 145, 227, 15/244.1, 228, 244.2, 244.3, 146

[56] References Cited

U.S. PATENT DOCUMENTS

| | | | |
|---|---|---|---|
| 2,715,237 | 8/1955 | Trindl | 15/146 X |
| 2,816,311 | 12/1957 | Beck et al. | 15/210 |
| 2,877,483 | 3/1959 | Alvistur | 15/210 |
| 2,998,614 | 9/1961 | Winch | 15/210 |
| 3,225,375 | 12/1965 | Atkinson et al. | 15/147 X |
| 3,383,158 | 5/1968 | Leland | 15/210 X |
| 3,413,673 | 12/1968 | Gewirz | 15/105 |
| 3,720,976 | 3/1973 | Bailey | 15/227 X |
| 4,031,673 | 6/1977 | Hagelberg | 15/210 R X |
| 4,194,852 | 3/1980 | Cupp et al. | 15/145 X |
| 4,392,269 | 7/1983 | Nishiyama et al. | 15/145 |
| 4,523,347 | 6/1985 | Tames | 15/104.94 |
| 4,619,710 | 10/1986 | Kuenn et al. | 134/22.17 |

Primary Examiner—Chris K. Moore
Attorney, Agent, or Firm—Andrus, Sceales, Starke & Sawall

[57] ABSTRACT

A toilet bowl cleaner includes an effervescing, foaming cleaning composition contained within a biodegradable packet or pad and a holder for the packet or pad. The holder includes an elongate rigid handle member having a grip end and a head end, a tongue member pivotally mounted on the head end between a first attached position for attaching the disposable toilet bowl cleaning pad to the handle member and a second detached position for releasing the pad from the handle member, and a lock mechanism for releasably locking the tongue member to the head of the handle member. The disposable toilet bowl cleaning pad contains an effervescing compound for cleaning a toilet bowl which includes a surfactant, an alkali carbonate and an acid. Other ingredients may be added to the surfactant-alkali-acid composition to provide desired properties such as halogen containing compounds for providing germicidal properties and fillers as a carrier for the liquid surfactant.

6 Claims, 2 Drawing Sheets

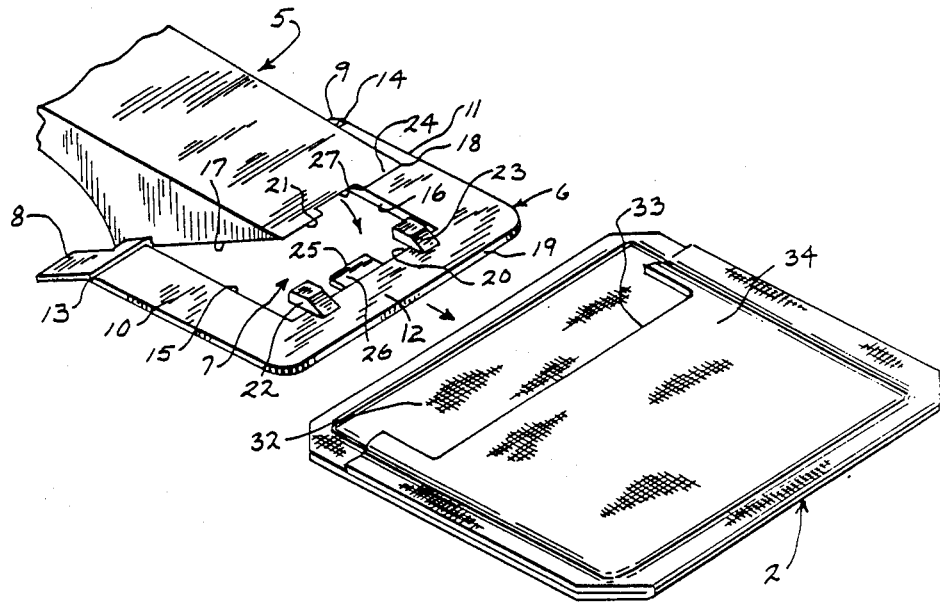

UNITED STATES PATENT OFFICE
CERTIFICATE OF CORRECTION

Patent No. 4,852,199　　　　　Dated August 1, 1989

Inventor(s) Edward Holbus

It is certified that error appears in the above-identified patent and that said Letters Patent is hereby corrected as shown below:

Claim 1, col. 6, line 19, "®nd" should be ---end ---.

Claim 8, col. 7, line 24, "depe" should be --- depending ---.

Claim 8, col. 7, line 30, add "and" after "volume".

Claim 8, col. 7, line 32, after "nozzles", add the following: --- for delivering high pressure water into the volume and a second series of vertical nozzles ---.

Signed and Sealed this

Twenty-second Day of May, 1990

Attest:

HARRY F. MANBECK, JR.

*Attesting Officer*　　　*Commissioner of Patents and Trademarks*